(12) United States Patent
Kim et al.

(10) Patent No.: US 9,903,674 B2
(45) Date of Patent: Feb. 27, 2018

(54) HEAT EXCHANGER FOR VEHICLE

(71) Applicants: Hyundai Motor Company, Seoul (KR); Kia Motors Corporation, Seoul (KR); Inzicontrols Co., Ltd., Siheung-si (KR); Kbautotech Co., Ltd., Asan-si (KR)

(72) Inventors: Jae Yeon Kim, Whasung-Si (KR); Sang Won Lee, Whasung-Si (KR); Sangyong Rhee, Whasung-Si (KR)

(73) Assignees: Hyundai Motor Company, Seoul (KR); Kia Motors Corporation, Seoul (KR); Inzicontrols Co., Ltd., Siheung-si (KR); Kbautotech Co., Ltd., Asan-si (KR)

( * ) Notice: Subject to any disclaimer, the term of this patent is extended or adjusted under 35 U.S.C. 154(b) by 34 days.

(21) Appl. No.: 15/098,535

(22) Filed: Apr. 14, 2016

(65) Prior Publication Data

US 2016/0363399 A1    Dec. 15, 2016

(30) Foreign Application Priority Data

Jun. 15, 2015    (KR) .......................... 10-2015-0084262

(51) Int. Cl.
*F28D 7/10* (2006.01)
*F28F 27/02* (2006.01)
(Continued)

(52) U.S. Cl.
CPC ............ *F28F 27/02* (2013.01); *F16K 31/002* (2013.01); *F28D 9/005* (2013.01); *F28D 9/0037* (2013.01);
(Continued)

(58) Field of Classification Search
CPC . F28F 27/02; F28F 3/086; F28F 9/002; F16K 31/002; F28D 9/0037; F28D 9/005;
(Continued)

(56) References Cited

U.S. PATENT DOCUMENTS

| 4,669,532 A | 6/1987 | Tejima et al. |
| 6,401,670 B2 | 6/2002 | Frunzetti et al. |
| 7,044,437 B1 * | 5/2006 | Martin ...................... F01K 9/04 138/42 |

(Continued)

FOREIGN PATENT DOCUMENTS

| DE | 100 19 029 A1 | 10/2001 |
| JP | 2012-007826 A | 1/2012 |

(Continued)

*Primary Examiner* — Davis Hwu
(74) *Attorney, Agent, or Firm* — Morgan, Lewis & Bockius LLP (57) ABSTRACT

A heat exchanger for a vehicle may include a heat radiating device including a plurality of inflow holes and a plurality of discharge holes that are thinned at a side of the heat radiating device, allows respective working fluids to flow into and to be discharged therefrom, includes flow paths that are alternately formed by stacking a plurality of plates so that the respective working fluids flow in the flow paths, and exchanges heat between the working fluids that flow through the respective flow paths, and a valve device which is connected to the respective inflow holes and one of the discharge holes, and allows one of the working fluids to flow into the flow path or bypasses the one working fluid to control the flow of the working fluid by using linear displacement which changes in accordance with temperatures of the respective inflow working fluids.

18 Claims, 8 Drawing Sheets

(51) Int. Cl.
*F16K 31/00* (2006.01)
*F28D 9/00* (2006.01)
*F28F 3/08* (2006.01)
*F28F 9/00* (2006.01)
*F28D 21/00* (2006.01)

(52) U.S. Cl.
CPC .............. *F28F 3/086* (2013.01); *F28F 9/002* (2013.01); *F28D 2021/0089* (2013.01)

(58) Field of Classification Search
CPC ........ F28D 2021/0089; B60H 1/00278; B60H 1/00007
USPC .......................................................... 165/41
See application file for complete search history.

(56) References Cited

U.S. PATENT DOCUMENTS

| | | | |
|---|---|---|---|
| 9,517,677 B2 * | 12/2016 | Tokuda | B60H 1/00278 |
| 2003/0145609 A1 * | 8/2003 | Maisotsenko | F24F 3/1411 |
| | | | 62/121 |
| 2008/0267845 A1 * | 10/2008 | Hoglund | B01F 5/0451 |
| | | | 422/224 |
| 2015/0000869 A1 | 1/2015 | Denoual et al. | |

FOREIGN PATENT DOCUMENTS

| | | |
|---|---|---|
| JP | 2015-505028 A | 2/2015 |
| KR | 10-2014-0102492 A | 8/2014 |
| KR | 20-0474396 Y1 | 9/2014 |
| KR | 10-1526427 B1 | 6/2015 |

\* cited by examiner

HEAT EXCHANGER FOR VEHICLE

CROSS-REFERENCE TO RELATED APPLICATION

The present application claims priority to Korean Patent Application No. 10-2015-0084262, filed Jun. 15, 2015, the entire contents of which is incorporated herein for all purposes by this reference.

BACKGROUND OF THE INVENTION

Field of the Invention

The present invention relates to a heat exchanger for a vehicle, and more particularly, to a heat exchanger for a vehicle, which allows respective working fluids to flow into the heat exchanger, and selectively exchanges heat between the respective working fluids in accordance with temperatures of the inflow working fluids, thereby adjusting the temperatures.

Description of Related Art

In general, a heat exchanger transfers heat from a high-temperature fluid to a low-temperature fluid through a heat transfer wall, and the heat exchanger is used for a heater, a cooler, an evaporator, a condenser, and the like.

The heat exchanger reuses thermal energy or adjusts a temperature of a working fluid that flows in suitably for use, and the heat exchanger is usually applied to an air conditioning system for a vehicle, a transmission oil cooler, and the like, and mounted in an engine room.

Here, when the heat exchanger is mounted in the engine room having a limited space, it is difficult to ensure a space and mount the heat exchanger, and as a result, research is being conducted to make the heat exchanger small, reduce a weight of the heat exchanger, and enhance efficiency and functions of the heat exchanger.

However, the heat exchanger in the related art needs to adjust the temperatures of respective working fluids in accordance with a state of the vehicle, and then supply the working fluids to an engine, a transmission, and the air conditioning system of the vehicle, and to this end, separate branch circuits and valves need to be installed on flow paths of the inflow working fluids, and as a result, there are problems in that the number of constituent elements and the number of assembling processes are increased, and a layout becomes complicated.

In addition, in a case in which the separate branch circuits and valves are not installed, it is impossible to control the amount of heat being exchanged in accordance with a flow rate of the working fluid, and as a result, there is also a problem in that the temperature of the working fluid cannot be efficiently adjusted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat exchanger for a vehicle, which adjusts flows of transmission oil and a coolant in accordance with temperatures of the transmission oil and the coolant, and adjusts the temperatures of the transmission oil and the coolant by selectively exchanging heat between the transmission oil and the coolant, thereby improving fuel efficiency of the vehicle by warming up and cooling the transmission oil, and improving performance of a transmission.

According to various aspects of the present invention, a heat exchanger for a vehicle may include a heat radiating device including a plurality of inflow holes and a plurality of discharge holes that are formed at one side of the heat radiating device, allows respective working fluids to flow into and to be discharged therefrom, may include flow paths that are alternately formed by stacking a plurality of plates so that the respective working fluids flow in the flow paths, and may exchange heat between the working fluids that flow through the respective flow paths, and a valve device which is connected to the respective inflow holes and one of the discharge holes, and allows one of the working fluids to flow into the flow path or bypasses the one working fluid to control the flow of the working fluid by using linear displacement which changes in accordance with temperatures of the respective inflow working fluids.

The respective inflow holes and the discharge hole may include first and second inflow holes formed at respective edges at one end portion in a longitudinal direction at one side of the heat radiating device, and first and second discharge holes formed at respective edges at another end portion in the longitudinal direction at the one side of the heat radiating device so as to correspond to the first and second inflow holes.

The first and second inflow holes may be disposed collinearly with the first and second discharge holes.

The working fluids may include coolants which flow in from an oil cooler and a radiator, and transmission oil which flows in from a transmission.

The respective flow paths may include first flow paths connected to the first inflow hole and the first discharge hole inside the heat radiating device and in which the working fluid flowing in through the first inflow hole flows, and second flow paths which are alternately formed between the respective first flow paths, and connected to the second inflow hole and the second discharge hole, and in which the working fluid flowing in through the second inflow hole flows.

The valve device may include a housing provided therein with a first space, and a second space connected with the first space, and having first and second connecting holes formed at one side corresponding to the first and second inflow holes and connected with the first space, a first inflow port formed at a lateral circumference and connected with the first space, a second inflow port connected with the second space, first and second mounting holes connected with both ends of the first space based on a width direction of the heat radiating device, and a third mounting hole connected with the second space at a side directed toward the second discharge hole based on the longitudinal direction of the heat radiating device, a first opening and closing device mounted through the first and second mounting holes, and provided in the first space, and selectively connecting the second connecting hole with the first space while expanding and contracting in accordance with a temperature of the working fluid that flows into the first space and flows into the first inflow hole through the first connecting hole, a second opening and closing device provided in the second space, and selectively connecting the second connecting hole with the second space while expanding and contracting in accordance with a temperature of the working fluid flowing into the second space, and a discharge connector provided in the third mounting hole, and having a third connecting hole formed at one side corresponding to the second discharge hole and connected with the second discharge hole.

The first space and the second space may be disposed perpendicularly to each other in the longitudinal direction and a width direction of the heat radiating device, and an end portion of the second space may be connected with the first space through a flow hole.

The first opening and closing device may include a valve slider inserted to be slidable toward the first space through the second mounting hole, and having a fixing groove formed at a center therein, and an opening groove partially formed around an outer circumferential surface, a first fixing rod having one end fixed to a fixing groove of the valve slider, a first deformable member which is inserted into the first space through the first mounting hole, has one end that is mounted in an insertion hole formed in the first space such that another end of the first fixing rod is inserted, and moves the first fixing rod while the first deformable member expands or contracts therein in accordance with a change in temperature of the working fluid, a fixing nut fastened to the first deformable member inserted from the insertion hole toward the second mounting hole, and fixing the first deformable member, a nipple plug mounted in the first mounting hole, and fixed through a first snap ring mounted in the first mounting hole, a fixing plug mounted in the second mounting hole, and fixed through a second snap ring mounted in the second mounting hole, and a first elastic member interposed between the fixing plug and the valve slider, and providing elastic force to the valve slider.

The valve slider may be formed in a cylindrical shape having a closed surface directed toward the second mounting hole, and the opening groove may be positioned to be directed toward the second connecting hole.

First and second sealing rings may be interposed between the nipple plug and an inner circumferential surface of the first mounting hole and between the fixing plug and an inner circumferential surface of the second mounting hole, respectively.

The first deformable member may divide the interior of the first space based on the first connecting hole and the second connecting hole so as to prevent the working fluid flowing into the first inflow port and the working fluid flowing in through the nipple plug from being mixed.

The first deformable member may be configured to move the first fixing rod forward while expanding, and allow an opening groove formed in the valve slider to be positioned in the second connecting hole to open the first inflow hole.

The first deformable member may be a wax material that contracts and expands therein in accordance with a temperature of the working fluid.

The first elastic member may be formed as a coil spring that has one end supported by the valve slider, and another end supported by the fixing plug.

The second opening and closing device may include a second fixing rod having one end fixed to a mounting device formed at one end portion directed toward the first space inside the second space, a second deformable member having one end portion inserted into another end of the second fixing rod, and moving on the second fixing rod while expanding or contracting therein in accordance with a change in temperature of the working fluid flowing into the second space through the second inflow port, a valve member mounted at one side of the second deformable member, and configured to selectively open and close the flow hole when the second deformable member expands or contracts, and a second elastic member interposed between the valve member and the discharge connector, and providing elastic force to the valve member.

The second deformable member may be configured to open the flow hole while moving forward on the second fixing rod together with the valve member when the second deformable member expands, and may have another end portion that is inserted into the discharge connector and disconnects connection between the second inflow port and the second discharge hole.

The second deformable member includes a wax material that contracts or expands therein in accordance with a temperature of the working fluid.

The valve member may be formed in a circular plate shape, may have at a center thereof a penetration hole into which the second deformable member is inserted, and may be fixed to the second deformable member through a fixing ring mounted in the second deformable member.

The second elastic member may be formed as a coil spring having one end supported by the valve member, and another end supported by the discharge connector.

The discharge connector may be fixed through a third snap ring mounted in the third mounting hole.

As described above, according to the heat exchanger for a vehicle according to various embodiments of the present invention, it is possible to adjust a flow of the coolant in accordance with temperatures of the transmission oil and the coolant, and adjust the temperature of the transmission oil by exchanging heat between the transmission oil and the coolant, thereby improving fuel efficiency of the vehicle by warming up and cooling the transmission oil, and improving performance of a transmission.

In addition, valves, which were separately installed in the related art, are omitted, and the heat exchanger is integrally provided with the valve device, such that it is possible to simplify a piping layout, and improve package properties, thereby reducing costs and weights.

In addition, two deformable members, which are operated in accordance with temperatures of the transmission oil and the coolant, are utilized for a single valve device, thereby improving responsiveness to an operation of opening and closing the valve, and more efficiently controlling a flow of the working fluid.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
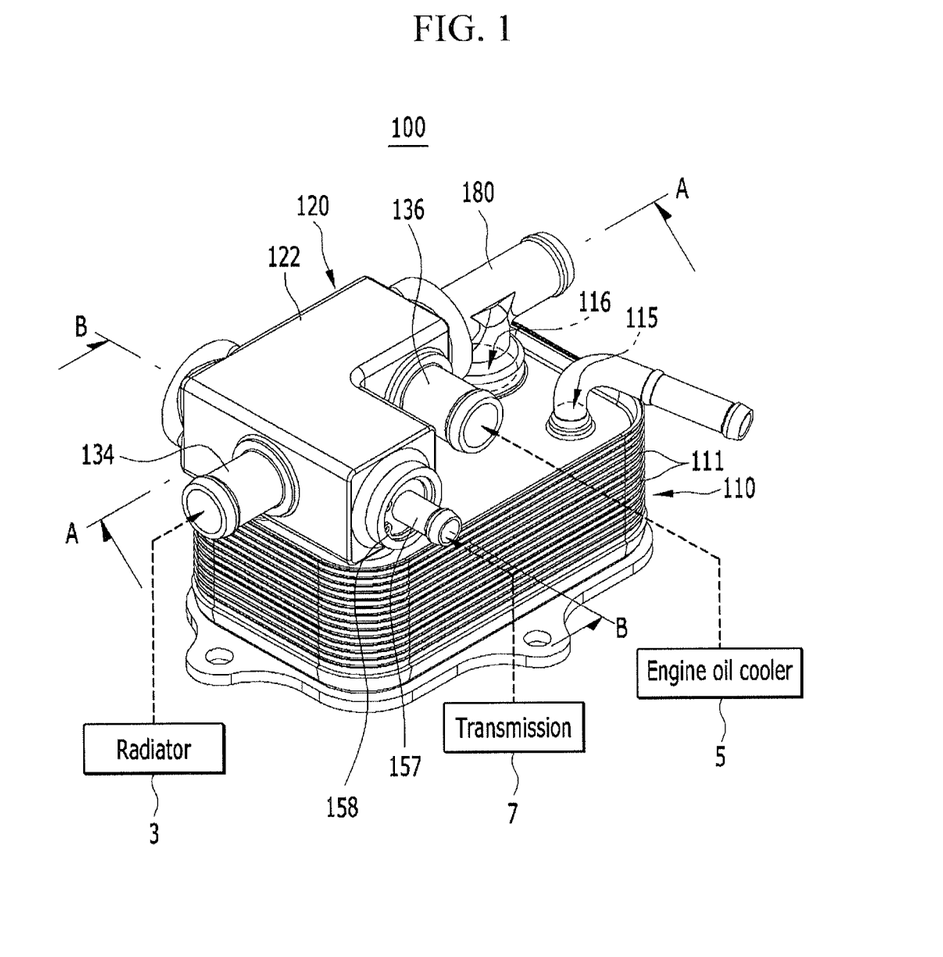
FIG. 1 is a perspective view of an exemplary heat exchanger for a vehicle according to the present invention.
Figure 2:
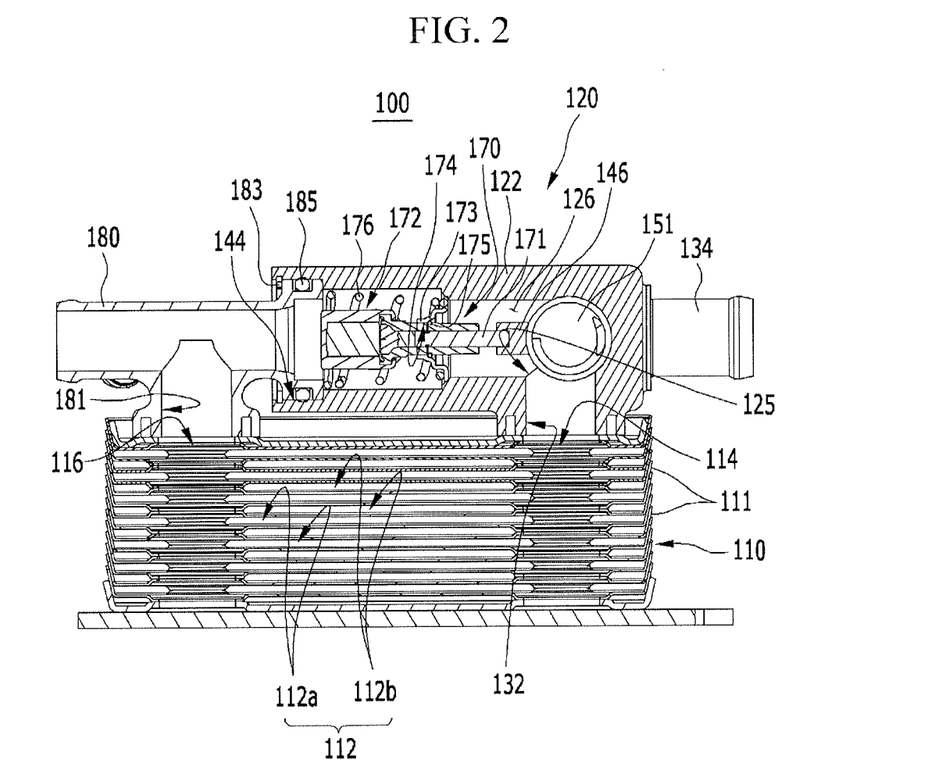
FIG. 2 is a cross-sectional view taken along line A-A of FIG. 1.
Figure 3:
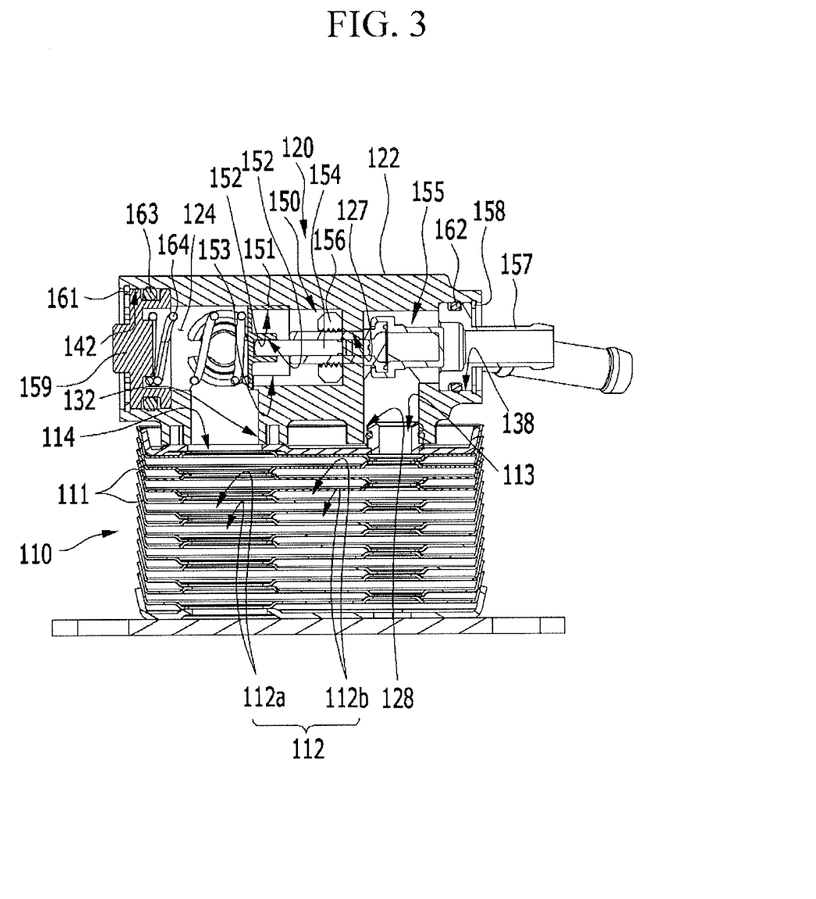
FIG. 3 is a cross-sectional view taken along line B-B of FIG. 1.
Figure 4:
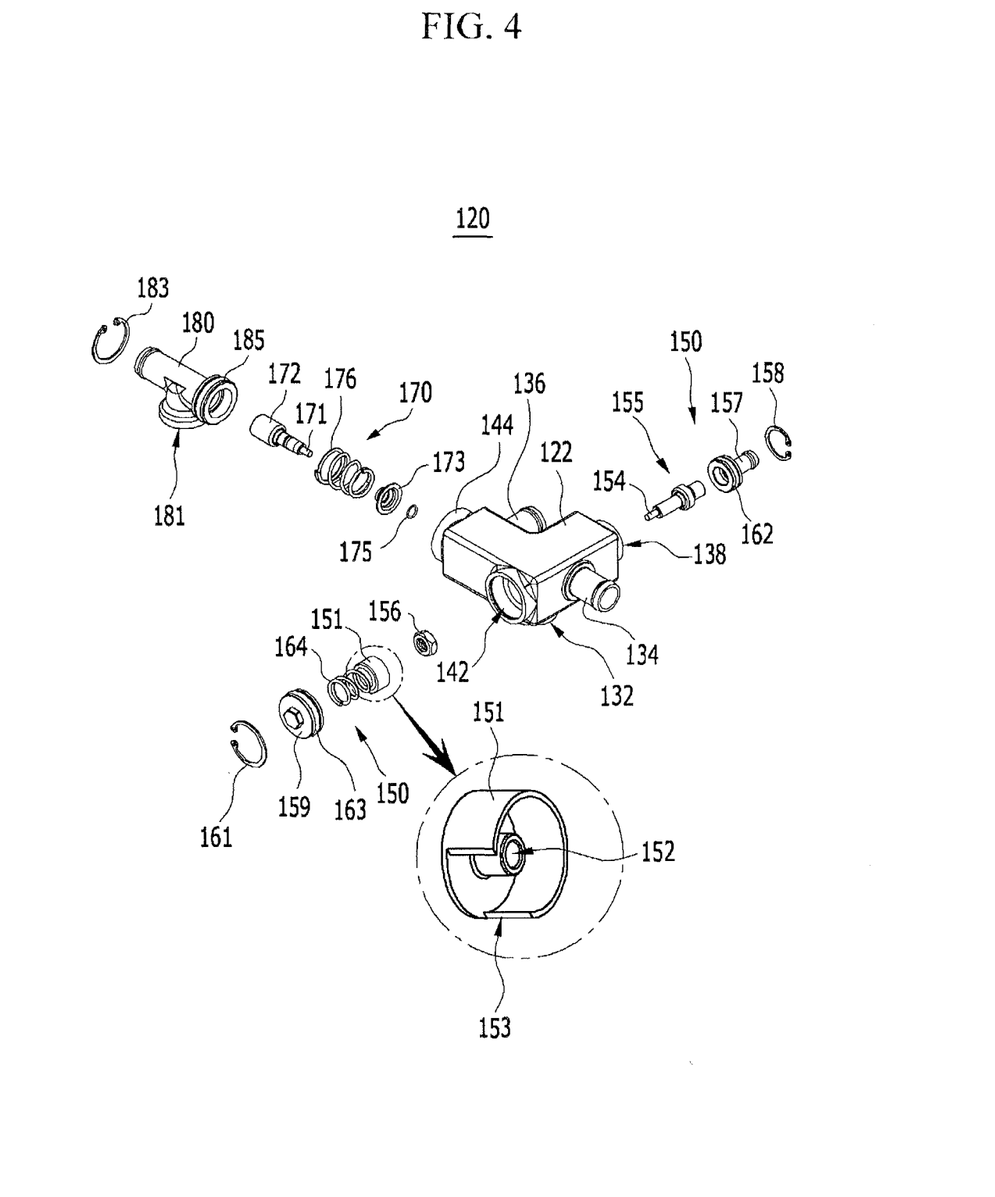
FIG. 4 is an exploded perspective view of a valve device applied to the exemplary heat exchanger for a vehicle according to the present invention.
Figure 5:
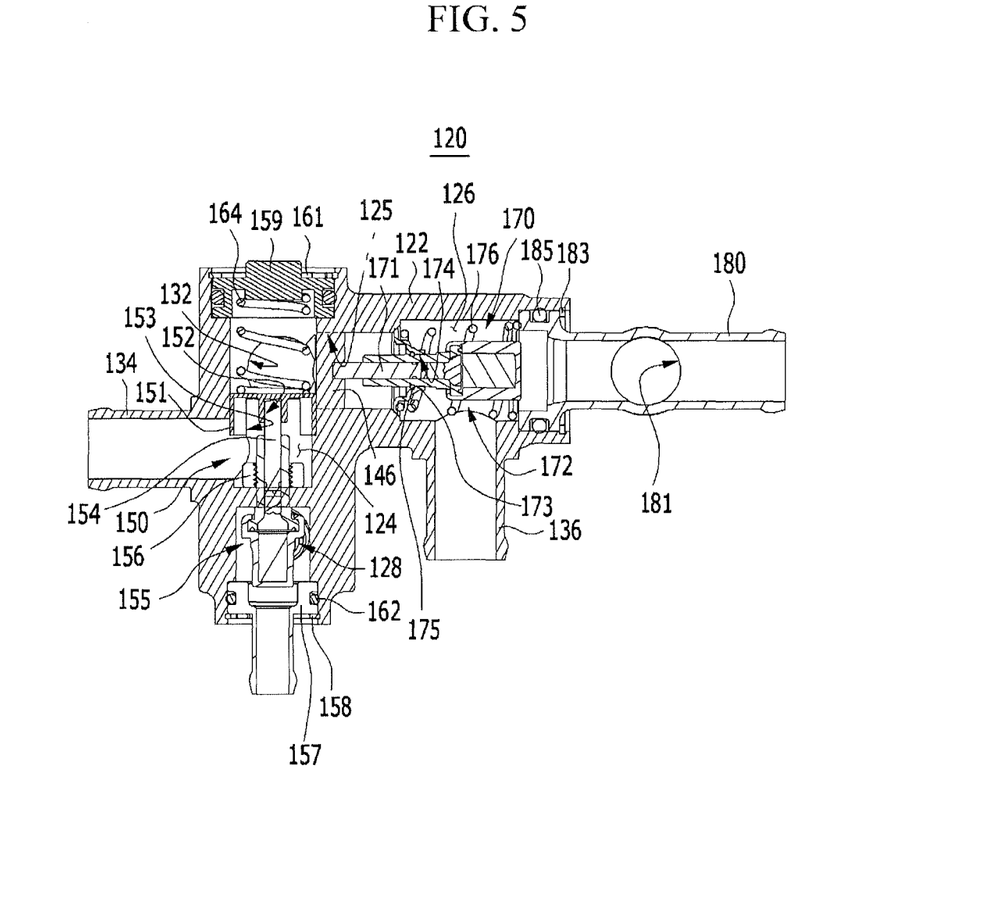
FIG. 5 is a cross-sectional view of the valve device applied to the exemplary heat exchanger for a vehicle according to the present invention.

FIG. 1 is a perspective view of a heat exchanger for a vehicle according to various embodiments of the present invention, FIG. 2 is a cross-sectional view taken along line A-A of FIG. 1, FIG. 3 is a cross-sectional view taken along line B-B of FIG. 1, FIG. 4 is an exploded perspective view of a valve device applied to the heat exchanger for a vehicle according to various embodiments of the present invention, and FIG. 5 is a cross-sectional view of the valve device applied to the heat exchanger for a vehicle according to various embodiments of the present invention.

As illustrated in FIG. 1, a heat exchanger 100 for a vehicle according to various embodiments of the present invention serves to cool or warm up transmission oil in a vehicle, and allows a coolant passing through a radiator 3 or a coolant passing through an engine oil cooler 5 to selectively flow into the heat exchanger in accordance with a temperature of the transmission oil, thereby exchanging heat between the coolant and the transmission oil.

That is, in various embodiments, respective working fluids include the coolants which flow in from the radiator 3 and the engine oil cooler 5, and the transmission oil which flows in from a transmission 7, and the heat exchanger 100 selectively exchanges heat between the respective coolants and the transmission oil, thereby adjusting the temperature of the transmission oil.

To this end, the heat exchanger 100 for a vehicle according to various embodiments of the present invention is connected with the radiator 3, the engine oil cooler 5, and the transmission 7.

As illustrated in FIGS. 2 to 5, the heat exchanger 100 includes a heat radiating device 110, and a valve device 120, and will be described below in more detail for each constituent element.

First, a plurality of inflow holes and a plurality of discharge holes are formed at one side of the heat radiating device 110, respectively, to allow the inflow of the respective working fluids and discharge the respective working fluids.

The heat radiating device 110 has flow paths 112 which are alternately formed by stacking a plurality of plates 111 such that the respective working fluids flow in the flow paths 112, thereby exchanging heat between the coolant and the transmission oil which flow through the respective flow paths 112, respectively.

Here, the inflow holes and the discharge holes may include first and second inflow holes 113 and 115 which are formed at an edge of one end portion in a longitudinal direction at one side of the heat radiating device 110, respectively, and first and second discharge holes 114 and 116 which are formed at an edge of the other end portion in the longitudinal direction at one side of the heat radiating device 110 so as to correspond to the first and second inflow holes 113 and 115.

Therefore, the first and second inflow holes 113 and 115 are connected to the first and second discharge holes 114 and 116 inside the heat radiating device 110 through the respective flow paths 112, respectively.

The first and second inflow holes 113 and 115 and the first and second discharge holes 114 and 116 may be collinearly disposed at one side of the heat radiating device 110, respectively, in a state in which the first and second inflow holes 113 and 115 and the first and second discharge holes 114 and 116 are spaced apart from each other in the longitudinal direction, respectively.

In the various embodiments, the respective flow paths 112 include a first flow path 112a, and a second flow path 112b.

The first flow paths 112a are connected to the first inflow hole 113 and the first discharge hole 114 inside the heat radiating device 110, and the transmission oil, which is the working fluid that flows in through the first inflow hole 113, flows through the first flow paths 112a.

The second flow paths 112b are alternately formed between the respective first flow paths 112a, and connected to the second inflow hole 115 and the second discharge hole 116, such that the coolant, which is the working fluid that flows in through the second inflow hole 115, flows through the second flow paths 112b.

Meanwhile, in various embodiments, the transmission oil, which flows in through the first inflow hole 113 and is discharged through the first discharge hole 114, flows through the first flow paths 112a, and the coolant, which flows in through the second inflow hole 115 and is discharged through the second discharge hole 116, flows through the second flow paths 112b, but the coolant and the transmission oil may be changed and applied, and the same may apply to other working fluids other than the coolant and the transmission oil.

Further, the valve device 120 is connected to the first and second inflow holes 113 and 115 and the first discharge hole 114, and allows the coolant to flow into the second flow path 112b or bypasses the coolant to control the flow of the coolant by using linear displacement which changes in accordance with temperatures of the inflow transmission oil and the coolant.

The valve device 120 includes a housing 122, a first opening and closing device 150, a second opening and closing device 170, and a discharge connector 180.

First, the housing 122 is provided therein with a first space 124, and a second space 126 connected with the first space 124.

Here, the first space 124 and the second space 126 are disposed in the longitudinal direction and a width direction of the heat radiating device 110 so as to be perpendicular to each other, and an end of the second space 126 may be connected with the first space 124 through a flow hole 125.

First and second connecting holes 128 and 132 are formed at one side of the housing 122, which corresponds to the first and second inflow holes 113 and 115, and connected with the first space 124, and a first inflow port 134, which is connected with the first space 124, and a second inflow port 136, which is connected with the second space 126, are formed at a lateral circumference.

In addition, the housing 122 has first and second mounting holes 138 and 142 which are connected with both ends of the first space 124 based on the width direction of the heat radiating device 110.

Further, the housing 122 has a third mounting hole 144 that is formed at a side toward the second discharge hole 116 based in the longitudinal direction of the heat radiating device 110 and connected with the second space 126.

The housing 122, which is configured as described above, may have an external appearance in the form of an "L" shaped quadrangular block.

In various embodiments, the first opening and closing device 150 is mounted through the first and second mounting holes 138 and 142, and provided in the first space 124.

The first opening and closing device 150 selectively connects the second connecting hole 132 with the first space 124 while expanding and contracting in accordance with the temperature of the transmission oil which flows into the first space 124 and then flows into the first inflow hole 113 through the first connecting hole 128.

Here, the first opening and closing device 150 includes a valve slider 151, a first fixing rod 154, a first deformable member 155, a fixing nut 156, a nipple plug 157, a fixing plug 159, and a first elastic member 164.

First, the valve slider 151 is inserted so as to be slidable toward the first space 124 through the second mounting hole 142, has a fixing groove 152 at a center therein, and has an opening groove 153 partially formed around an outer circumferential surface of the valve slider 151.

Here, one side of the valve slider 151, which is directed toward the second mounting hole 142, is formed in a closed cylindrical shape, and the opening groove 153 may be positioned to be directed toward the second connecting hole 132.

The first fixing rod 154 is formed in a circular bar shape, and one end of the first fixing rod 154 is fixed to the fixing groove 152 of the valve slider 151.

The first deformable member 155 is inserted into the first space 124 through the first mounting hole 138, and the other end of the first fixing rod 154 is inserted into the first deformable member 155 in a state in which one end of the first deformable member 155 is mounted in an insertion hole 127 formed in the first space 124, and the first deformable member 155 moves the first fixing rod 154 while expanding and contracting therein in accordance with a change in temperature of the working fluid.

The fixing nut 156 is fastened to the first deformable member 155, which is inserted from the insertion hole 127 toward the second mounting hole 142, thereby fixing the first deformable member 155.

In various embodiments, the nipple plug 157 is mounted in the first mounting hole 138, and fixed through a first snap ring 158 mounted in the first mounting hole 138.

Here, the first deformable member 155 divides the interior of the first space 124 based on the first connecting hole 128 and the second connecting hole 132, thereby preventing the coolant, which is supplied from the radiator and flows into the first inflow port 134, from being mixed with the transmission oil which flows in through the nipple plug 157.

In the various embodiments, the fixing plug 159 is mounted in the second mounting hole 138, and fixed through a second snap ring 161 mounted in the second mounting hole 142.

Here, first and second sealing rings 162 and 163 may be interposed between an inner circumferential surface of the first mounting hole 138 and the nipple plug 157 and between an inner circumferential surface of the second mounting hole 142 and the fixing plug 159, respectively.

The first and second sealing rings 162 and 163 seal a portion between the inner circumferential surface of the first mounting hole 138 and the nipple plug 157 and a portion between the inner circumferential surface of the second mounting hole 142 and the fixing plug 159, respectively, thereby preventing the coolant and the transmission oil from leaking.

Further, the first elastic member 164 is interposed between the fixing plug 159 and the valve slider 151, and provides elastic force to the valve slider 151.

The first elastic member may be formed as a coil spring which has one end supported by the valve slider 151, and the other end supported by the fixing plug 159.

The first opening and closing device 150, which is configured as described above, moves forward the first fixing rod 154 toward the second mounting hole 142 when the first deformable member 155 expands, and allows the opening groove 153 formed in the valve slider 151 to be positioned in the second connecting hole 132, thereby opening the second inflow hole 115.

Then, the coolant, which has flowed into the first space 124 through the first inflow port 134, may flow into the second flow path 112*b* of the heat radiating device 110 through the second inflow hole 115 opened by the valve slider 151.

In this state, when the first deformable member 155 contracts, the valve slider 151 quickly returns to an initial position by elastic force of the compressed first elastic member 164.

In the various embodiments, the second opening and closing device 170 is provided in the second space 126, and selectively connects the second connecting hole 132 with the second space 126 while expanding and contracting in accordance with the temperature of the working fluid flowing into the second space 126.

The second opening and closing device 170 includes a second fixing rod 171, a second deformable member 172, a valve member 173, and a second elastic member 176.

First, one end of the second fixing rod 171 is fixed to a mounting device 146 formed at one end portion directed toward the first space 124 inside the second space 126.

One end portion of the second deformable member 172 is inserted into the other end portion of the second fixing rod 171.

The second deformable member 172 moves on the second fixing rod 171 while expanding and contracting therein in accordance with a change in temperature of the coolant which is supplied from the engine oil cooler 5 and flows into the second space 126 through the second inflow port 136.

In the various embodiments, the valve member 173 is mounted at one side of the second deformable member 172, and selectively opens and closes the flow hole 125 when the second deformable member 172 expands and contracts, thereby allowing the coolant, which has flowed into the second space 126, to flow into the heat radiating device 110 through the second inflow hole 115.

Here, the valve member 173 is formed in a circular plate shape, and has a penetration hole 174, at a center thereof, into which the second deformable member 172 is inserted, and may be fixed to the second deformable member 172 through a fixing ring 175 mounted on the second deformable member 172.

Therefore, the valve member 173 selectively opens and closes the flow hole 125 while moving together with the second deformable member 172.

Further, the second elastic member 176 is interposed between the valve member 173 and the discharge connector 180, and provides elastic force to the valve member 173.

Here, the second elastic member 176 may be formed as a coil spring which has one end supported by the valve member 173, and the other end supported by the discharge connector 180.

The second opening and closing device 170, which is configured as described above, opens the flow hole 125 while moving forward on the second fixing rod 171 together with the valve member 173 when the second deformable member 172 expands, and the other end portion of the second opening and closing device 170 is inserted into the discharge connector 180 so as to disconnect the connection between the second inflow port 136 and the second discharge hole 116.

Then, the coolant, which is supplied from the engine oil cooler 5 and flows into the second space 126 through the second inflow port 136, flows into the second inflow hole 115 through the flow hole 125 opened by the valve member 173, and passes through the second flow path 112b of the heat radiating device 110.

In this state, when the second deformable member 172 contracts, the valve member 173, which is supplied with elastic force from the compressed second elastic member 176, quickly returns to the initial position together with the second deformable member 172, thereby closing the flow hole 125.

Meanwhile, the first deformable member 155 and the second deformable member 172 may be made of a wax material that expands and contracts therein in accordance with the temperature of the working fluid.

Here, the wax material has a volume that expands or contracts in accordance with a temperature, the volume in the wax material expands as the temperature increases, and the volume contracts again as the temperature decreases, and returns to an initial volume.

That is, the first and second deformable members 155 and 172 are configured as assemblies including the wax material therein, and may move the first fixing rod 154 forward and rearward or move forward and rearward on the second fixing rod 171 when the wax material therein changes in volume in accordance with the temperature while the external appearance is not deformed, and when the wax material contracts, the first and second deformable members 155 and 172 more quickly return to the initial position by the elastic force of the first and second elastic members 164 and 176.

Further, the discharge connector 180 is mounted in the third mounting hole 144, and a third connecting hole 181 is formed at one side corresponding to the second discharge hole 116, and connected with the second discharge hole 116.

Here, the discharge connector 180 is fixed through a third snap ring 183 mounted in the third mounting hole 144.

The discharge connector 180 discharges the coolant, which is discharged through the second discharge hole 116, to the outside of the heat radiating device 110 and the valve device 120.

A third sealing ring 185 may be interposed between the discharge connector 180 and an inner circumferential surface of the third mounting hole 144.

The third sealing ring 185 seals a portion between the discharge connector 180 and the inner circumferential surface of the third mounting hole 144, thereby preventing the coolant from leaking.

Hereinafter, an operation of the heat exchanger 100 for a vehicle according to various embodiments of the present invention, configured as described above, will be described with reference to the attached FIGS. 6 to 8.

Figure 6:
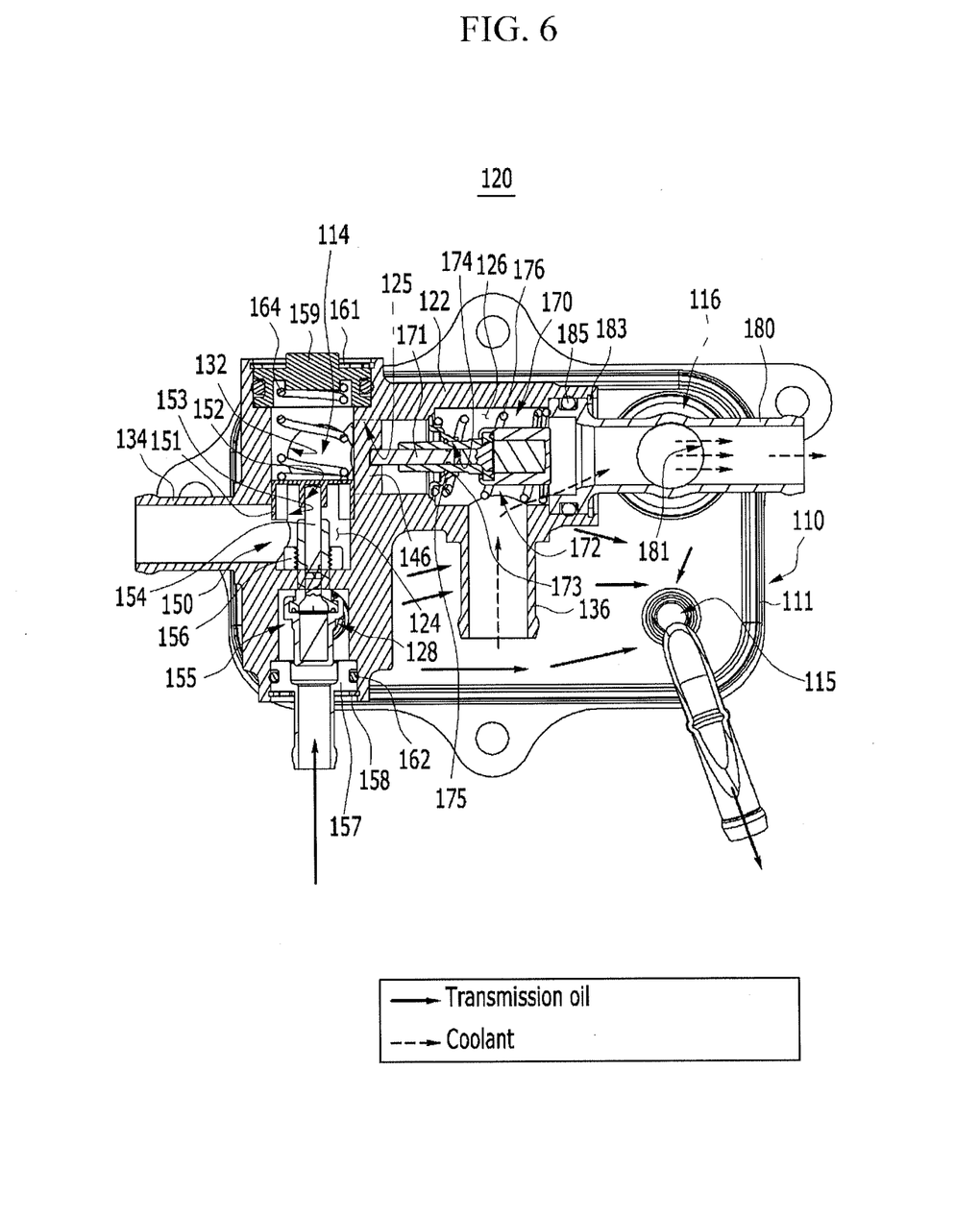
FIG. 6, FIG. 7, and FIG. 8 are views illustrating, stepwise, states in which the exemplary heat exchanger for a vehicle according to the present invention is operated.
Figure 7:
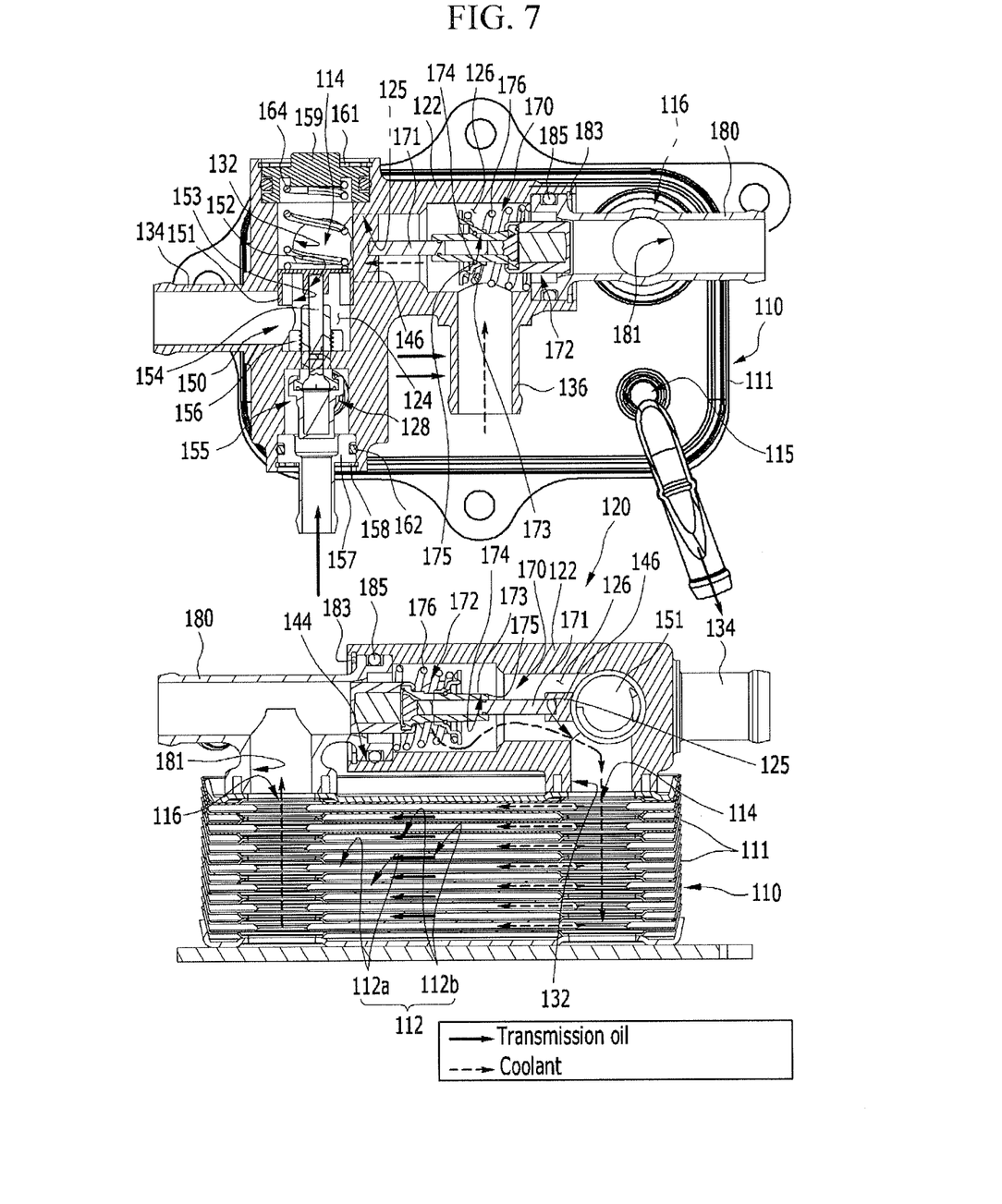
Figure 8:
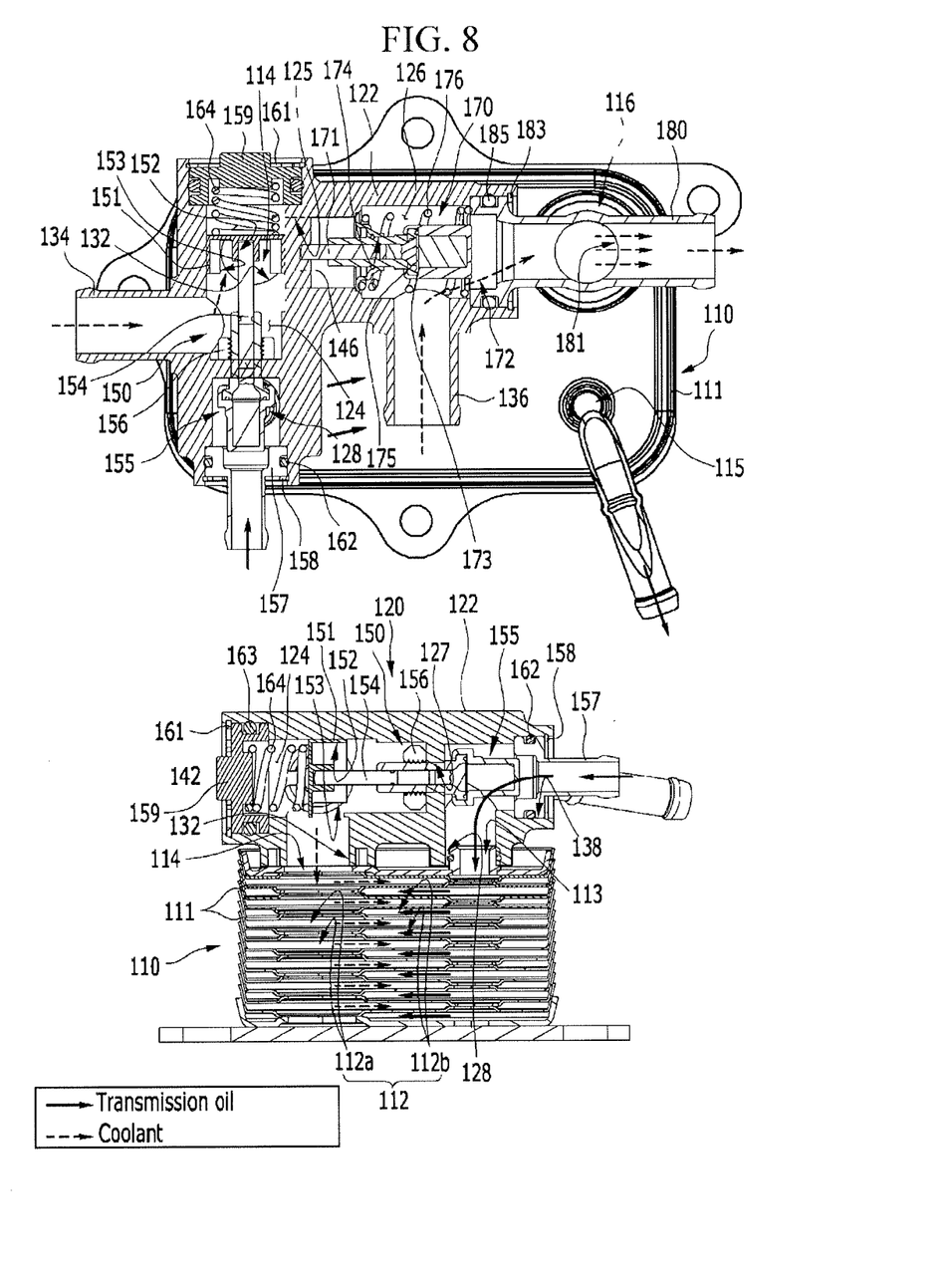

FIGS. 6 to 8 are views illustrating, stepwise, states in which the heat exchanger for a vehicle according to various embodiments of the present invention is operated.

First, in a case in which the temperature of the transmission oil is lower than a predetermined temperature (about 110° C.), and the temperature of the coolant supplied from the engine oil cooler 5 is lower than a predetermined temperature (about 70° C.), the first deformable member 155 of the first opening and closing device 150 is not deformed as illustrated in FIG. 6, and as a result, the valve slider 151 maintains an initially mounted state, such that the second inflow hole 115 is in a closed state.

In addition, the second deformable member 172 of the second opening and closing device 170 is also not deformed by the coolant at a temperature below the predetermined temperature, and as a result, the valve member 173 maintains an initially mounted state, such that the flow hole 125 is in a closed state.

In this case, the cool coolant supplied from the radiator 3 flows into the first space 124 of the housing 122 through the first inflow port 134, but the valve slider 151 maintains the closed state of the second inflow hole 115, thereby preventing the coolant from flowing into the second flow path 112b of the heat radiating device 110.

At the same time, the coolant supplied from the engine oil cooler 5 flows into the second inflow port 136, but as the flow hole 125 is maintained in the closed state, the coolant is bypassed from the second space 126 and discharged to the outside through the discharge connector 180.

Therefore, the transmission oil discharged from the transmission 7 flows in through the nipple plug 157, flows into the first inflow hole 113 from the first space 124, is discharged through the first discharge hole 114 while passing through the respective first flow paths 112a in a state in which heat exchange with the coolant is prevented, and then is supplied back to the transmission 7.

This operation is carried out when a heating mode of the vehicle is activated, and since the coolant does not pass though the interior of the heat radiating device 110, the temperature of the coolant is prevented from being decreased due to the heat exchange with the transmission oil.

Meanwhile, in a case in which the temperature of the transmission oil is lower than a predetermined temperature (about 110° C.), and the temperature of the coolant supplied from the engine oil cooler 5 is higher than a predetermined temperature (about 70° C.), the first deformable member 155 of the first opening and closing device 150 is not deformed as illustrated in FIG. 7, and as a result, the valve slider 151 maintains the initially mounted state, such that the second inflow hole 115 is in a closed state.

Further, the interior of the second deformable member 172 of the second opening and closing device 170 expands as the coolant at a predetermined temperature or higher flows in, such that the second deformable member 172 closes the discharge connector 180 while moving forward on the second fixing rod 171 toward the discharge connector 180, and as a result, the valve member 173 opens the flow hole 125 so that the second space 126 and the second inflow hole 115 are connected.

In this case, the cool coolant supplied from the radiator 3 flows into the first space 124 of the housing 122 through the first inflow port 134, but as the valve slider 151 maintains the closed state of the second inflow hole 115, the coolant is prevented from flowing into the second flow path 112b of the heat radiating device 110.

However, in a state in which the coolant supplied from the engine oil cooler 5 is prevented from being immediately bypassed and discharged through the discharge connector 180, the coolant flows through the second inflow port 136, passes through the opened flow hole 125, flows into the second inflow hole 115 of the heat radiating device 110, and then passes through the respective second flow paths 112b.

Therefore, the transmission oil discharged from the transmission 7 flows in through the nipple plug 157, and flows into the first inflow hole 113 from the first space 124, and a temperature thereof is increased by the heat exchange with the coolant, which passes through the second flow path 112b at a predetermined temperature or higher while passing through the respective first flow paths 112a, such that the transmission oil in a warmed up state is discharged through the first discharge hole 114, and then supplied back to the transmission 7.

This operation is carried out when the engine of the vehicle is initially started and when the transmission oil is required to be warmed up, and the coolant at a predetermined temperature or higher passes through the heat radiating device 110, thereby quickly increasing the temperature of the transmission oil at a low temperature.

Further, in a case in which the temperature of the transmission oil is higher than a predetermined temperature (about 110° C.), and the temperature of the coolant supplied from the engine oil cooler 5 is lower than a predetermined temperature (about 70° C.), the first deformable member 155 of the first opening and closing device 150 expands and moves the first fixing rod 154 forward toward the fixing plug 159 as illustrated in FIG. 8, such that the valve slider 151 moves forwards and opens the second inflow hole 115 through the opening groove 153.

In addition, the second deformable member 172 of the second opening and closing device 170 is not deformed by the coolant at a predetermined or lower, such that the valve member 173 maintains the initially mounted state, and the flow hole 125 is in a closed state.

In this case, the cool coolant supplied from the radiator 3 flows into the first space 124 of the housing 122 through the first inflow port 134, and flows into the second inflow hole 115 opened through the opening groove 153, such that the coolant passes through the respective second flow paths 112b in the heat radiating device 110.

At the same time, the coolant supplied from the engine oil cooler 5 flows in through the second inflow port 136, but as the flow hole 125 maintains the closed state, the coolant is bypassed from the second space 126 and immediately discharged to the outside of the valve device 120 through the discharge connector 180.

Therefore, the transmission oil discharged from the transmission 7 flows in through the nipple plug 157, and flows into the first inflow hole 113 from the first space 124, and in a state in which the transmission oil is cooled by the heat exchange with the coolant, which is supplied from the radiator 3 and flows the respective second flow paths 112b at a predetermined temperature or lower, while passing through the respective first flow paths 112a, the transmission oil is discharged through the first discharge hole 114, and supplied back to the transmission 7.

The operation is carried out when the vehicle travels and the transmission oil is required to be cooled, and the cool coolant supplied from the radiator 3 passes through the interior of the heat radiating device 110, and as a result, it is possible to more quickly decrease the temperature of the transmission oil at a high temperature and cool the transmission oil.

Meanwhile, when the aforementioned operation is carried out, the first and second elastic members 164 and 176 included in the first opening and closing device 150 and the second opening and closing device 170 maintain the compressed state when the first and second deformable members 155 and 172 expand, and when the first and second deformable members 155 and 172 contract again, the first and second elastic members 164 and 176 provide elastic force so that the valve slider 151 and the valve member 173 quickly return to the initially mounted position.

With this operation, the heat exchanger 100 for a vehicle according to various embodiments of the present invention may improve responsiveness of the opening and closing operation of the valve device 120.

As described above, when the heat exchanger 100 for a vehicle according to various embodiments of the present invention is applied, it is possible to adjust the temperature of the transmission oil by controlling the flow of the coolant in accordance with the temperatures of the transmission oil and the coolant, thereby improving fuel efficiency of the vehicle by warming up and cooling the transmission oil, and improving performance of the transmission.

In addition, the temperature of the transmission oil is efficiently adjusted in accordance with a driving state of the vehicle, such that friction may be reduced in the transmission 7 at the time of cold start and a slip may be prevented when the vehicle travels, thereby improving fuel efficiency of the vehicle and durability of the transmission.

In addition, valves, which were separately installed in the related art, are omitted, and the heat exchanger 100 is integrally provided with the valve device 120, such that it is possible to simplify a piping layout, and improve package properties, thereby reducing costs and weights.

Further, the first and second opening and closing device 150 and 170, to which the first and second deformable members 155 and 172 which are operated in accordance with the temperatures of the transmission oil and the coolant are applied, are provided in the single valve device 120, thereby improving responsiveness of the operation of opening and closing the valve, efficiently controlling the flow of the working fluid, and improving overall marketability of the vehicle.

Meanwhile, in explaining the heat exchanger 100 for a vehicle according to various embodiments of the present invention, the configuration in which the working fluids include the coolant and the transmission oil has been described as exemplary embodiments, but the present invention is not limited thereto, and may be applied to all working fluids, which are required to be cooled or increased in temperature through the heat exchange.

Further, in describing the heat exchanger for a vehicle according to various embodiments of the present invention, the configuration in which the plurality of plates 111 is simply stacked in the drawings has been described as exemplary embodiments, but the present invention is not limited thereto, a cover, a bracket, or the like, which prevents damage to the heat exchanger due to contact with other components or fixes the heat exchanger to other components or in the engine room, may be mounted on one surface and the other surface of the heat exchanger in consideration of a process of mounting the heat exchanger.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for a vehicle, comprising:
   a heat radiating device including a plurality of inflow holes and a plurality of discharge holes formed at a side of the heat radiating device, allowing respective working fluids to flow into and to be discharged therefrom, including flow paths alternately formed by stacking a plurality of plates so that the respective working fluids flow in the flow paths, and exchanging heat between the working fluids flowing through the respective flow paths; and
   a valve device connected to the respective inflow holes and one of the discharge holes, and allowing one of the working fluids to flow into the flow path or bypassing the one working fluid to control the flow of the working fluid by using linear displacement changing in accordance with temperatures of the respective inflow working fluids,
   wherein the respective inflow holes and the discharge hole include:
      first and second inflow holes formed at respective edges at a first end portion in a longitudinal direction at a side of the heat radiating device; and
      first and second discharge holes formed at respective edges at another end portion in a longitudinal direction at the side of the heat radiating device to correspond to the first and second inflow holes, and
   wherein the valve device includes:
      a housing provided therein with a first space, and a second space connected with the first space, and having first and second connecting holes formed at a side corresponding to the first and second inflow holes and connected with the first space, a first inflow port formed at a lateral circumference and connected with the first space, a second inflow port connected with the second space, first and second mounting holes connected with both ends of the first space based on a width direction of the heat radiating device, and a third mounting hole connected with the second space at a side directed toward the second discharge hole based on a longitudinal direction of the heat radiating device;
      a first opening and closing device mounted through the first and second mounting holes, and provided in the first space, and selectively connecting the second connecting hole with the first space while expanding and contracting in accordance with a temperature of the working fluid that flows into the first space and flows into the first inflow hole through the first connecting hole;
      a second opening and closing device provided in the second space, and selectively connecting the second connecting hole with the second space while expanding and contracting in accordance with a temperature of the working fluid flowing into the second space; and
      a discharge connector provided in the third mounting hole, and having a third connecting hole formed at a side corresponding to the second discharge hole and connected with the second discharge hole.

2. The heat exchanger of claim 1, wherein the first and second inflow holes are disposed collinearly with the first and second discharge holes.

3. The heat exchanger of claim 1, wherein the working fluids include:
   coolants flowing in from an oil cooler and a radiator; and
   transmission oil flowing in from a transmission.

4. The heat exchanger of claim 1, wherein the respective flow paths include:
   first flow paths which are connected to the first inflow hole and the first discharge hole inside the heat radiating device and in which the working fluid flowing in through the first inflow hole flows; and
   second flow paths which are alternately formed between the respective first flow paths, and connected to the second inflow hole and the second discharge hole, and in which the working fluid flowing in through the second inflow hole flows.

5. The heat exchanger of claim 1, wherein the first space and the second space are disposed perpendicularly to each other in a longitudinal direction and a width direction of the heat radiating device, and an end portion of the second space is connected with the first space through a flow hole.

6. The heat exchanger of claim 1, wherein the first opening and closing device includes:
   a valve slider inserted to be slidable toward the first space through the second mounting hole, and having a fixing groove formed at a center therein, and an opening groove partially formed around an outer circumferential surface;
   a first fixing rod having a first end fixed to a fixing groove of the valve slider;
   a first deformable member which is inserted into the first space through the first mounting hole, has a first end that is mounted in an insertion hole formed in the first space such that another end of the first fixing rod is inserted, and moves the first fixing rod while the first deformable member expands or contracts therein in accordance with a change in temperature of the working fluid;
   a fixing nut fastened to the first deformable member inserted from the insertion hole toward the second mounting hole, and fixing the first deformable member;
   a nipple plug mounted in the first mounting hole, and fixed through a first snap ring mounted in the first mounting hole;

a fixing plug mounted in the second mounting hole, and fixed through a second snap ring mounted in the second mounting hole; and a first elastic member interposed between the fixing plug and the valve slider, and providing elastic force to the valve slider.

7. The heat exchanger of claim 6, wherein the valve slider is formed in a cylindrical shape having a closed surface directed toward the second mounting hole, and the opening groove is positioned to be directed toward the second connecting hole.

8. The heat exchanger of claim 6, wherein first and second sealing rings are interposed between the nipple plug and an inner circumferential surface of the first mounting hole and between the fixing plug and an inner circumferential surface of the second mounting hole, respectively.

9. The heat exchanger of claim 6, wherein the first deformable member divides the interior of the first space based on the first connecting hole and the second connecting hole to prevent the working fluid flowing into the first inflow port and the working fluid flowing in through the nipple plug from being mixed.

10. The heat exchanger of claim 6, wherein the first deformable member is configured to move the first fixing rod forward while expanding, and allow an opening groove formed in the valve slider to be positioned in the second connecting hole to open the first inflow hole.

11. The heat exchanger of claim 6, wherein the first deformable member comprises a wax material that contracts and expands therein in accordance with a temperature of the working fluid.

12. The heat exchanger of claim 6, wherein the first elastic member is formed as a coil spring that has a first end supported by the valve slider, and another end supported by the fixing plug.

13. The heat exchanger of claim 5, wherein the second opening and closing device includes:

a second fixing rod having a first end fixed to a mounting device formed at a first end portion directed toward the first space inside the second space;

a second deformable member having a first end portion inserted into another end of the second fixing rod, and moving on the second fixing rod while expanding or contracting therein in accordance with a change in temperature of the working fluid flowing into the second space through the second inflow port;

a valve member mounted at a side of the second deformable member, and configured to selectively open and close the flow hole when the second deformable member expands or contracts; and a second elastic member interposed between the valve member and the discharge connector, and providing elastic force to the valve member.

14. The heat exchanger of claim 13, wherein the second deformable member is configured to open the flow hole while moving forward on the second fixing rod together with the valve member when the second deformable member expands, and has another end portion that is inserted into the discharge connector and disconnects connection between the second inflow port and the second discharge hole.

15. The heat exchanger of claim 13, wherein the second deformable member comprises a wax material that contracts or expands therein in accordance with a temperature of the working fluid.

16. The heat exchanger of claim 13, wherein the valve member is formed in a circular plate shape, has at a center thereof a penetration hole into which the second deformable member is inserted, and is fixed to the second deformable member through a fixing ring mounted in the second deformable member.

17. The heat exchanger of claim 13, wherein the second elastic member is formed as a coil spring having a first end supported by the valve member, and another end supported by the discharge connector.

18. The heat exchanger of claim 1, wherein the discharge connector is fixed through a third snap ring mounted in the third mounting hole.

* * * * *